3,741,889
OXIDATIVE SWEETENING OF HYDROCARBONS WITH A CALCINED COPPER-CONTAINING PRECIPITATE OF SILICA SOL AND IRON SALT
Sun W. Chun, Murrysville, Harry A. Hamilton, Natrona Heights, and Angelo A. Montagna, Monroeville, Pa., assignors to Gulf Research & Development Company, Pittsburgh, Pa.
No Drawing. Filed July 15, 1971, Ser. No. 163,042
Int. Cl. C10g 27/04
U.S. Cl. 208—191      5 Claims

ABSTRACT OF THE DISCLOSURE

A copper-iron group metal catalyst useful for the conversion of thiols to disulfides is prepared by forming a solution of a substantially alkali metal-free silica sol and an iron group metal salt, such as ferric chloride, forming a gelatinous precipitate wherein the atomic ratio of the iron group metal to silicon to oxygen is from 1:2:5.5 to 1:12:25.5 and dispersing in said gelatinous precipitate an aqueous solution of a copper salt, such as $CuCl_2$, and thereafter drying and calcining said composite.

---

This invention relates to a method of preparing a catalyst comprising silicon, oxygen, an iron group metal and copper for use in a sweetening process.

BACKGROUND OF THE INVENTION

Distillates containing objectionable sulfur derivatives as thiols are known as "sour" distillates, and processes for oxidizing the thiols or sulfhydril (—SH) containing compounds to less objectionable disulfides are known as sweetening processes. The sweetening process is believed to be an oxidative coupling of two mercaptan molecules to give a disulfide, and thus the processes are normally and preferably run in the presence of a gas containing free molecular oxygen.

One of the most widely used catalysts for sweetening of sour petroleum fractions is copper chloride, either in solution or on various supports. The use of sodium plumbite and caustic are also known. More recently, a patent to Norman L. Carr et al., U.S. Pat. 3,491,020, suggests the use of a catalyst composite comprising an inorganic amorphous polymer of iron, silicon and oxygen for the selective oxidation of thiols to disulfides. All of the above processes suffer, however, from low throughput life before the catalyst is required to be regenerated.

An improved catalyst has now been discovered for the sweetening of sour hydrocarbons. This improved catalyst is made, in accordance with the invention, by first forming a solution of a substantially alkali metal-free silica sol and an iron group metal salt, preferably $FeCl_3$. By an "iron group metal" is meant iron, nickel or cobalt. The solution is then cogelled with a base such as $NH_3$ to form a gelatinous precipitate. A solution of a copper salt, such as aqueous $CuCl_2$, is then dispersed into the gelatinous precipitate, after which, the gelatinous precipitate is dried and calcined. The iron group metal to silicon to oxygen atomic ratio in the final product is from about 1:2:5.5 to about 1:12:25.5 and the atomic ratio of the copper to the iron group metal is from 0.05:1 to 1.5:1.

The use of catalysts comprising silicon, oxygen and an iron group metal chemically combined to form an inorganic polymer structure is known in the art for the sweetening of hydrocarbons (see, for example, U.S. Pat. 3,491,020 to Norman L. Carr et al.). The use of copper chloride as a hydrocarbon sweetening catalyst has been known for a much longer period of time. The teachings of Carr et al. suggest the use of various promoting agents, including selenium or one of the alkali metals. Absent from the teachings of Carr et al. is any suggestion or teaching that a copper salt can be used as a promoting agent for an inorganic polymer consisting of iron, oxygen and silicon. This may be so since copper salts are not known as promoting agents but rather are sweetening catalysts in their own right. It was therefore surprising to find the addition of copper salts to the gelatinous form of the iron-silicon-oxygen precipitate in the manner set forth above would result in a catalyst having unusually long life for the sweetening of sour hydrocarbons. For example, the addition of copper salts to a previously dried and/or calcined iron-silicon-oxygen composite having the same chemical formula results in a catalyst having a reduced lifetime for the sweetening of sour hydrocarbons compared to the catalyst of this invention.

The catalytic composite described with reference to iron as the iron group metal and without copper is a chemical combination comprising iron, oxygen and silicon in an amorphous, inorganic, high molecular weight polymer-like material containing multiple and random Si—O—Si, Si—O—Fe, and Fe—O—Fe linkages, with each silicon atom directly united to four oxygen atoms and each iron atom directly united to three oxygen atoms. When the copper salt is added by the method of this invention, a Mossbauer spectra indicated that a substantial portion of the copper was present as the spinel $CuFe_2O_4$. The copper is not present as crystalline $CuCl_2$ as shown by X-ray powder diffraction analysis.

In the practice of the process of the instant invention, it is desirable that the silica sol be free or substantially free of cationic impurities. By "cationic impurities" are meant metallic cations, especially the alkali metals, as, for example, sodium, and the alkaline earth metals, as exemplified by calcium. When such metallic cations are present in the silica sol, they cannot readily be removed at later stages of the catalyst preparation and become included in the catalyst structure.

A number of methods are available for the preparation of a cation-free, dilute silica sol. Preferably, a dilute aqueous solution of a sodium silicate, such as water glass, is flowed, as by percolation or pumping, through a bed of protonated cation-exchange material to recover an effluent dilute silica sol substantially free of cationic impurities. Any soluble silicate can be used in this method, but the sodium silicate solutions commonly known in the art as "water glass" are preferred since they are inexpensive and readily available.

The silicate solution used in preparing the cation-free silica sol is dilute, preferably containing no more than the equivalent of about five weight percent silica and preferably between one and three percent silica. Solutions more or less concentrated can be empolyed satisfactorily, the upper and lower limits being that concentration which will pass through the ion-exchange column without gelling and that volume of liquid which can be conveniently handled, respectively.

Any solid cation-exchange material insoluble in water can be used to prepare the protonated silica sol. Cation-exchange resins of high cation-exchange capacity such as sulfonated phenol formaldehyde resins or divinylbenzene crosslinked sulfonated polystyrene resins, like Amberlite IR-120 (manufactured by Rohm and Haas), have given excellent results in the production of dilute silica sols. In every instance the ion-exchange material must be in acid form. It can be placed in this form by washing with a suitable strong acid such as sulfuric acid or hydrochloric acid. Any residual free acid can be washed from the ion-exchange material with water.

In producing the cation-free silica sol, a single bed of cation-exchange material can be employed, or a plurality of beds arranged in series or in parallel, or both, can be used. When beds are employed in series, it is advantageous to feed the fresh silicate solution to the most nearly spent bed of cation-exchange material with a substantially cation-free silica sol emanating from the most recently regenerated bed of ion-exchange material. Regeneration is accomplished by acid washing, as described above for the initial preparation of the ion-exchange material. To determine when a bed is spent, it is convenient to measure continuously or from time to time the pH or the conductivity of the effluent silica sol. The pH of a satisfactory sol is in the neighborhood of three and its specific conductance is in the neighborhood of $10^{-4}$ to $10^{-5}$ ohm$^{-1}$ cm.$^{-1}$. When the pH rises to about five, the processing is preferably interrupted for regeneration of the beds.

The pH of the silica sol is desirably maintained at a level less than five to prevent premature gelation of the sol. As indicated below, dilute, cation-free silica sols are unstable, tending to gel, which tendency is greatly accelerated when the pH is raised. Further, a rise in pH of the effluent silica sol indicates that the ion-exchange bed is no longer functioning efficiently in exchanging protons for cationic impurities. Maintaining the pH at less than five tends to maximize the stability of the silica sol while minimizing the concentration of cationic impurities.

Silica sols, substantially free of cationic impurities as prepared by other methods can also be employed within the scope of this invention. For example, satisfactory dilute cation-free silica sol can be made by hydrolysis of ethylorthosilicate or of silicon tetrachloride.

"Water glass" is prepared by fusing silica with sodium carbonate, the product is a colloidal suspension of silica in sodium silicate. When this suspension of silica in sodium silicate is treated by passage through a protonated ion-exchange column, the resulting product is an aqueous colloidal suspension of silica and silicic acid having a pH of about three. This silica sol, wherein the colloidal particles of silica and silicic acid are very finely dispersed, is the starting material for this invention. The silica sol in this form is relatively stable in that it does not get immediately, but on standing, changes akin to polymerization do occur. The colloidal particles become larger and the molecular weight of the silicic acid increases as the chain length grows. This process continues until the material has gelled. It is believed that polymerization is a function of pH, the nature of the impurities, the mobility of the impurities and the mobility of the particles. It has also been found that thermal aging of the silica sol, for example at temperatures from about 150° F. to 250° F., preferably 180° F. to 200° F., for at least four hours, usually 4 to 24 hours, prior to reaction of the silica sol with Fe$^{+3}$ yields a final catalyst having large pores, i.e. a higher average pore radius.

According to the method of this invention, the freshly prepared (which includes thermal aging) silica sol, substantially free of cationic impurities, is preferably admixed promptly with the aqueous solution of the compound that yields the desired Group VIII iron group metal ion in solution. When the silica sol has been freshly prepared, the colloidal particles are very small in size and the molecular weight of the silicic acid is very low. These characteristics of the freshly prepared silica sol permit a near-atomic mixing of the elements to permit interaction of the silicon, iron group metal and oxygen to form a final composite having a high surface area, as high as 350 m.$^2$/g. and higher. Preferred practice is to admix the preferred iron group metal salt, i.e. an aqueous FeCl$_3$ solution, to the thermally aged silica sol.

For the practice of this invention, the salt of the Group VIII iron group metal employed must be soluble in the solvent used, for example, water, an alcohol such as ethyl alcohol, or other high dielectric constant materials such as dioxane, etc., in order that the iron group metal and silicon can form a cogel when the base is added. Examples of the salts of iron group metals which may be successfully employed in this invention are the nitrates; sulfates; halides; acetates; nitrites; and suitable organometallic compounds of cobalt, nickel and iron.

A list of suitable salts includes, but is not limited to: FeCl$_3$; Fe(NO$_3$)$_3$; Fe(NO$_3$)$_2$; FeCl$_2$; Fe(NO$_2$)$_2$; FeBr$_3$; Fe(C$_2$H$_3$O$_2$)$_3$; Fe$_2$(C$_2$O$_4$)$_3$·6H$_2$O; FeOCl;

$$Fe(ClO_4)_3 \cdot 6H_2O;$$

NiCl$_2$; NiF$_2$; Ni(NO$_3$)$_2$; CoCl$_2$; Ni(C$_2$H$_3$O$_2$)$_2$; Fe(SO$_4$)$_3$; CoF$_2$; and CO(NO$_3$)$_2$.

The most preferred iron group metal salt for use in the practice of the instant invention is ferric chloride. Ferric chloride is readily soluble in water, is inexpensive, is readily available in quantity, easily forms an insoluble gelatinous precipitate in the presence of basic substances such as ammonia, thereby readily permitting the desired cogelation and yields a finished catalytic product of outstanding properties. Although a preferred mode of operation is to use the iron group metals in their higher oxidation states, it is within the contemplation of this invention to employ a soluble salt of an iron group metal in its lower oxidation state, form the cogel and then oxidize the metal ion to its higher oxidation state.

When the silica sol is added to the solution of the iron group metal, mixing should be sufficiently thorough to produce a completely homogeneous liquid. Because cation-free dilute silica sols are unstable, having a tendency to gel, it is essential for superior results, as indicated above, that the silica sol be used soon after its preparation, i.e. within 12 hours, and preferably within one hour, after its preparation, said preparation (which includes thermal aging) as set forth above. The preferred practice is to admix the thermally aged silica sol to an aqueous solution of iron group metal cations. The solution of iron group metal cations will generally contain the cations of only one of the three iron group metals; however, the solution can contain a mixture of the cations of any two or all three of the iron group metals.

Once the mixture has been thoroughly homogenized, gelation is brought about by increasing the pH of the mixture. This may be done conveniently by addition of aqueous ammonia with stirring or addition of gaseous ammonia, as through a sparger. The base chosen for raising the pH of the mixture of silica sol and iron group metal cations should preferably be such as to leave no harmful residue in the resulting composition. The alkali metals and alkali metal hydroxides and such compounds therefore are not generally used for they leave a residue of alkali metal in the product difficult to remove by washing. Ammonia, on the other hand, is inexpensive, easily available, and leaves no residue upon calcination of the resulting gel. Other bases, such as trimethyl ammonium hydroxide, hydrozine or quinolinium hydroxide, can be employed, but they are expensive and are considered to have no particular advantage. When salts of nickel and cobalt and such metals are used as the source of iron group metal cations, ammonia cannot be used to adjust the pH since these metals form complex amines in admixture with ammonia. A convenient means of adjusting the pH, when salts of metals such as nickel or cobalt are used, is to add ammonium bicarbonate.

On addition of the base to the iron group metal cation-silica sol solution, a slurry is formed consisting of a gelatinous precipitate and water. Although this gelatinous precipitate can be removed at will, it is preferred to allow it to stand about 16 hours to assure complete precipitation. The precipitate can be separated from the supernatant liquid in any convenient manner as, for example, by filtration. The precipitate is then washed with water containing low levels of NH$_3$ to remove any contaminants. This washing process advantageously can be continued until conductivity measurements reach a constant level.

The copper salt can be dispersed in the gelatinous precipitate by any suitable means. Usually the copper salt is added as a solution to the gelatinous precipitate and is stirred or blended until a homogeneous gelatinous mass is obtained. A sufficient amount of the copper salt should be used so that the final catalyst has from 2 to 50 weightt percent, preferably from 5 to 35 weight percent, of the copper salt based on the total weight of the catalyst. In all cases, the salt concentrations are calculated on the basis the salts are anhydrous, i.e. having no water of hydration. Normally, an aqueous solution of the copper salt is employed, although alcoholic or other high dielectric constant mediums, such as dioxane or dimethylsulfoxide, can be employed to form copper salt solutions. By a "high dielectric constant material" is meant one having a dielectric constant of over eight at 25° C. Suitable copper salts include the halides, nitrates, sulfates and acetates such as copper chloride; copper bromide; copper iodide; copper fluoride; copper nitrate; copper acetate; copper tetraamine nitrate; and copper perchlorate.

The copper containing gelatinous precipitate can then be dried, for example, in a forced draft oven, at a temperature in the range of from 200° F. to 300° F. over a period of from 10 to 30 hours. The dried product can then, if desired, be calcined in air at a temperature from 400° F. to 800° F. over a period of from 10 to 20 hours, preferably at from about 500° F. to 700° F. for about 16 hours, to form the inorganic polymer base for the catalyst of the instant invention.

Not all concentrations of the iron group metals applicable to the practice of the instant invention can be employed under the process conditions herein set forth. At metal concentrations in excess of about 60 percent by weight, the catalyst demonstrates crystalline characteristics and displays an attendant loss of desirable properties. The iron group metal and silica sol are preferably used in proportions to make the catalytic composite with an atomic ratio of iron group metal to silicon to oxygen within the range of about 1:2:5.5 to about 1:12:25.5. The most preferred catalytic composite contains an iron group metal to silicon to oxygen atomic ratio of about 1:4:9.5. In the oxidized catalytic composite there is sufficient oxygen to fully satisfy the valence requirements of both the iron group metal and the silicon. This invention contemplates the utilization of either one, two or all three iron group metals in the catalyst composite, preferably with a total iron group metal content within the specified proportions.

The amount of copper to employ should be such that the atomic ratio of copper to the iron group metal is from 0.05:1 to 1.5:1, preferably from 0.1:1 to 1:1. Using these atomic ratios of copper to iron group metal and the above stated ratios of iron to silicon, the final catalyst has from 2 to 50 weight percent copper, preferably from 5 to 35 weight percent copper.

The composite has utility as a low temperature oxidation catalyst and an adsorbent for sulfur-containing compounds. In one embodiment, the composite can be used in an improved method for sweetening sour hydrocarbons. More particularly the catalytic composite can be used for selectively oxidizing mercaptan sulfur, which is contained in a hydrocarbon, to form disulfide sulfur, at a low temperature.

It has been found that if a petroleum distillate containing mercaptans is subjected, at a suitabe temperature, to contact with air or another source of oxygen in the presence of the cogelled catalytic copper containing composite of the process of the instant invention, such mercaptans are converted to alkyl disulfides or other non-corrosive compounds having no offensive odor and the distillate is thus "doctor" negative.

The charge stock which can be sweetened using the catalyst of this invention can be any atmospheric petroleum distillate having a boiling point from about 50° F. to 700° F. This boiling range encompasses petroleum fractions such as liquid petroleum gas to heavy distillate fuel oils. Usually sweetening processes are relegated to the lighter boiling charge stocks such as liquid petroleum gas, gasolines and naphthas. It is one of the advantages of the catalysts of this invention that they are useful for the sweetening of higher boiling petroleum distillates such as kerosene and heavy distillate fuel oils.

The contact treatment with the catalytic composite described above can be carried out at a temperature as low as 0° F. to 300° F. The preferred temperatures are in the range from 80° F. to 200° F. The process can be carried out at a pressure ranging from atmospheric to 500 p.s.i.g. The preferred range of pressure is from 25 to 100 p.s.i.g.

When added free oxygen in the form of air or other suitable source is used, it is advantageous to bring the oxygen and the distillate into intimate contact with each other prior to contact with the catalyst. The purpose of this oxygen addition is to replenish the structural oxygen removed from within the catalyst during the oxidation reaction. The catalytic composite contains sufficient chemisorbed or matrix oxygen within its structure which is available for sweetening to permit at least one complete cycle of a practical size without the addition of any oxygen whatever to the feed stock. However, the addition of process oxygen tends to extend the practical working cyclic time of the catalyst and reduces the frequency of reactivation. The oxygen concentration of the feed stock may range then, from no oxygen in the feed stock, to that naturally present, to that oxygen concentration resulting from complete saturation of the feed stock with air, or indeed in some cases the amount of air may exceed the saturation limit of the oil. Although one mode of operation, saturating the feed stock with air, is not critical within the contemplation of this invention, this air saturation eliminates any need for such control or metering apparatus as would be necessary if the air or oxygen concentration were critical when supplemental oxygen is used. It is also desirable and necessary for repeated use to subject the composite catalyst to a suitable regeneration treatment for reactivation when it becomes spent.

The catalyst does lose its activity in use, possibly as a result of a reduction in lattice oxygen within the catalyst or gum formation. It is not affected by by-product water. For this reason it is advantageous to employ multiple reactors which are alternately on stream. This permits the reactivation of one catalyst bed while the other or others continue to function. It has been found that the highest catalytic activity is achieved by a short-time activation with air at atmospheric pressure. The main purpose of reactivation is to remove gum and to replenish the oxygen in the lattice structure of the catalyst.

In a general embodiment of this invention, the sour hydrocarbon feed with or without added contact with air is heated. Usually the distillate or the mixture of distillate and air may be preheated to the reaction temperature or the mixture may be heated in the reaction vessel. Alternatively, the distillate may be optionally preheated and passed downflow through the reactor while air or other gas containing free molecular oxygen is passed concurrently with or countercurrently to the distillate charge stock. If the latter procedure is employed, care should be taken not to use excessive amounts of air since this will promote gum formation and thus tend to shorten the cycle life. Preferably the amount of oxygen is 1.5 times that stoichiometrically required to react with the thiols, but amounts from 0.5 to 20 times the stoichiometric quantity have been used.

The distillate and air are passed into the reaction vessel containing the copper catalyst under appropriate conditions of temperature and pressure. The space velocity of the sour distillate is in general dependent upon the properties desired for the final product, the thiol content of the charge stock and the particular temperature chosen. A suitable space velocity is in the range of one to 50 liquid volume hourly space velocity based on the total flow, but the space velocity is usually in the range of from 1 to 10 LVHSV.

The sweetened product together with any excess air is passed from the catalyst bed into a suitable condenser which is maintained at a temperature sufficiently low to condense any distillate vapors. The air is separated from the distillate and a noncorrosive and "doctor sweet" product is recovered. The invention will be further described with reference to the following experimental work.

A series of catalysts were prepared having varying amounts of $CuCl_2$ from 0 to 48% by weight. The basic recipe was as follows:

(1) 261 grams of sodium silicate solution (28.7% $SiO_2$) were admixed with 3 liters of distilled water and passed through a bed of 500 grams of a protonated ion-exchange resin to produce a silica sol (pH 3 to 3.5);

(2) The resin was washed with 1.5 liters of water and the washings were added to the silica sol;

(3) The silica sol was allowed to stand overnight at room temperature and then thermally aged for four hours at 180° F. in order to produce a gel with a larger average pore radius;

(4) 84.2 grams of $FeCl_2 \cdot 6H_2O$ were dissolved in 0.5 liter of distilled water and added to the silica sol at room temperature;

(5) To the resulting mixture was added with constant mixing, in a flow stream, dilute aqueous ammonia (about 9% $NH_3$) in an amount sufficient to raise the pH of the resulting mixture to 8;

(6) The slurry was allowed to stand overnight, then filtered and washed with water containing 0.0003% $NH_3$ until the conductivity reached a constant level;

(7) 13.09 grams of $CuCl_2 \cdot 2H_2O$ were dissolved in 150 ml. of water. This amount of $CuCl_2 \cdot 2H_2O$ is sufficient to prepare a catalyst having a nominal ten weight percent anhydrous $CuCl_2$. This solution was mixed with the gelatinous filter cake from (6) and blended until homogeneous;

(8) The wet mixture was allowed to stand overnight at room temperature, was oven dried at 250° F. for 16 hours and then calcined at 600° F. for 16 hours.

(9) The catalyst thus prepared was found to contain 4.84% Cu, 2.7% $Cl_2$, 11.5% Fe and 28.5% Si. The balance is primarily oxygen.

A series of runs was made using the catalysts containing 0, 10, 20 and 48% $CuCl_2$ by weight. The catalysts were used to sweeten a heavy distillate fuel oil whose properties are given on Table I below.

TABLE I.—HEAVY DISTILLATE FUEL OIL INSPECTIONS

| Inspection: | Heavy distillate fuel oil |
|---|---|
| Gravity, ° API | 40.4 |
| Viscosity, SUV, 100° F. | 37.3 |
| Flash, P–M, ° F. | 194 |
| Pour point, ° F. | +15 |
| Color, ASTM D–1500 | 0.5 |
| Total sulfur, weight percent | 0.12 |
| Mercaptan sulfur, p.p.m. | 394 |
| Total acid number, ASTM D–974 | 0.01 |
| Aniline point, ° F. | 175 |
| Distillation, ASTM D–86: | |
| Overpoint, ° F. | 428 |
| Endpoint, ° F. | 626 |
| 10% at (° F.) | 500 |
| 50% at (° F.) | 550 |
| 90% at (° F.) | 592 |

The sweetening reaction occurred by passing the heavy distillate together with 65 s.c.f. of air per bbl. upflow at 150° F.; 50 p.s.i.g. and a 9 liquid volume hourly space velocity through a bed of the catalyst. The sweetening activity was determined by testing the product oil at two-hour intervals using the doctor test (ASTM Test D–484) that is sensitive for detecting thiol sulfur concentrations of greater than 3 p.p.m. in the product. The results are shown on Table II below.

TABLE II.—SWEETENING OF HEAVY DISTILLATE USING Cu, Fe, Si, OXYGEN CATALYST

| | Percent of— | | Cu/Fe | Volume throughput of sweet product |
|---|---|---|---|---|
| | $CuCl_2$ | $Fe_2O_3$ | | |
| Example Number: | | | | |
| 1[1] | 0 | 21 | 0 | 9 |
| 2 | 10 | 22 | 0.27 | 288 |
| 3 | 20 | 22 | 0.54 | 684 |
| 4 | 48 | 21 | 1.36 | 126 |

[1] Tested at 4.5 LVHSV rather than 9.

A series of catalysts was prepared using as a base the catalyst of Example 1 and thereafter impregnating the base catalyst by the method of incipient wetness with an aqueous solution of $CuCl_2$ to deposit on the finished catalyst 1, 2, 4, 10 and 20% $CuCl_2$. The impregnated catalysts were dried at 250° F. for 16 hours and then calcined in air at 600° F. for 16 hours. These catalysts were then used to sweeten the same heavy distillate shown in Table I. The results are shown on Table III below.

TABLE III.—SWEETENING OF HEAVY DISTILLATE USING Cu IMPREGNATED Fe, Si, O CATALYST

[Conditions: 150° F., 50 p.s.i.g., 9 LVHSV, and 65 s.c.f. of air/bbl.]

| | Percent, $CuCl_2$ | Cu/Fe | Volume throughput of sweet product |
|---|---|---|---|
| Example number: | | | |
| 6 | 1 | 0.024 | 90 |
| 7 | 2 | 0.047 | 125 |
| 8 | 4 | 0.095 | 90 |
| 9 | 10 | 0.237 | 54 |
| 10 | 20 | 0.475 | 18 |

Referring to Tables II and III, it can be seen that the method of this invention provides a catalyst having unexpectedly long life for the sweetening of sour hydrocarbons.

Resort may be had to such variations and modifications as fall within the spirit of the invention and the scope of the appended claims.

We claim:

1. A process for the oxidative sweetening of sour hydrocarbons which comprises
    contacting a sour hydrocarbon under sweetening conditions with a calcined cogelled catalytic composite comprising iron, silicon, oxygen and copper, said composite resulting from the steps of
        forming a solution of a substantially alkali metal-free silica sol and an iron salt;
        cogelling said solution to form a gelatinous precipitate;
        dispersing said gelatinous precipitate into a solution of a copper salt;
        drying and calcining said copper-containing gelatinous precipitate;
        the amount of said silica sol, said iron salt and said copper salt being such that the iron salt to silicon to oxygen atomic ratio in the final product is from about 1:2:5.5 to about 1:12:25.5 and the atomic ratio of the copper to iron salt is from 0.05:1 to 1.5:1.

2. A process according to claim 1 wherein the sour hydrocarbon is contacted with said composite and in the presence of a gas containing free molecular oxygen.

3. A process according to claim 2 wherein the proportion of iron salt to silica sol is selected to result in a calcined cogelled product having an iron to silicon to oxygen atomic ratio of about 1:4:9.5; an atomic ratio of copper to iron from 0.1:1 to 1:1 and wherein the amount of iron is from about 10 to about 60 weight percent of said composite.

4. A process according to claim 3 wherein the sweetening conditions comprise a temperature from about 0° to about 300° F.; and a pressure from about 0 to about 500 p.s.i.g.

5. A process according to claim 4 wherein said sour hydrocarbon is a distillate boiling from 50° F. to 700° F.

References Cited
UNITED STATES PATENTS

| | | | |
|---|---|---|---|
| 2,289,924 | 7/1942 | Morrell et al. | 208—191 |
| 2,297,620 | 9/1942 | Henderson et al. | 208—189 |
| 2,418,884 | 4/1947 | Hoover | 208—191 |
| 3,491,020 | 1/1970 | Carr et al. | 208—189 |
| 3,555,106 | 1/1971 | Ohmori | 252—474 |
| 3,617,518 | 11/1971 | Sinfelt et al. | 252—474 |

DELBERT E. GANTZ, Primary Examiner

G. J. CRASANAKIS, Assistant Examiner